United States Patent
Hanwell et al.

(10) Patent No.: US 12,524,915 B2
(45) Date of Patent: Jan. 13, 2026

(54) METHODS AND APPARATUS FOR IMAGE PROCESSING

(71) Applicant: Arm Limited, Cambridge (GB)

(72) Inventors: David Hanwell, Sale (GB); Laurence Mark Arden, Bramcote (GB)

(73) Assignee: Arm Limited, Cambridge (GB)

( * ) Notice: Subject to any disclaimer, the term of this patent is extended or adjusted under 35 U.S.C. 154(b) by 349 days.

(21) Appl. No.: 18/189,367

(22) Filed: Mar. 24, 2023

(65) Prior Publication Data

US 2023/0316579 A1 Oct. 5, 2023

Related U.S. Application Data

(60) Provisional application No. 63/325,275, filed on Mar. 30, 2022.

(30) Foreign Application Priority Data

Aug. 3, 2022 (GB) ...................................... 2211301

(51) Int. Cl.
G06T 9/00 (2006.01)

(52) U.S. Cl.
CPC ...................................... G06T 9/00 (2013.01)

(58) Field of Classification Search
CPC .... G06T 9/00; G06T 1/60; G06T 1/20; H04N 19/426; H04N 19/42

See application file for complete search history.

(56) References Cited

U.S. PATENT DOCUMENTS

2012/0213448 A1 8/2012 Malmborg et al.
2014/0376607 A1* 12/2014 Kurupati .............. H04N 19/182
375/240.02

OTHER PUBLICATIONS

Image Compression using DPCM, Sharma et al 2017; https://www.grdjournals.com/uploads/article/GRDJE/V02/104/0044/GRDJEV021040044.pdf (Year: 2017).*
Search Report for GB Application No. 2211301.3 dated Jan. 26, 2023, 4 pages.

* cited by examiner

*Primary Examiner* — Jianxun Yang
(74) *Attorney, Agent, or Firm* — NIXON & VANDERHYE P.C.

(57) ABSTRACT

A method of processing image data, the image data comprising a plurality of data values arranged in two or more sequences, each sequence comprising a first number of data positions each having a data value of the plurality, and each data value comprising a second number of bits, the method comprising: upon receiving each sequence of the two or more sequences, processing the data values of the sequence to determine, for each given data position of the first number of data positions, a representative value for the given data position based on a relationship between the data value at the given data position and the data value at one or more neighbouring data positions.

16 Claims, 4 Drawing Sheets

METHODS AND APPARATUS FOR IMAGE PROCESSING

CROSS-REFERENCE TO RELATED APPLICATIONS

This application claims priority pursuant to 35 U.S.C. 119(a) to U.S. application Ser. No. 63/325,275, filed Mar. 30, 2022, and U.K. Application No. 2211301.3, filed on Aug. 3, 2022, which applications are incorporated herein by reference in their entireties.

FIELD OF THE INVENTION

The present technology relates generally to methods and apparatus for processing image data. In particular, the present technology relates to image data and image meta data compression.

BACKGROUND

In many image processing implementations, it is often necessary to temporarily store processed or unprocessed image data or meta data for use in later processing. An image processing system implemented in an ASIC (Application Specific Integrated Circuit) typically has two different forms of such storage available: SRAM and DRAM.

SRAM is physically located next to or within the logic which implements the image processing algorithm and is dedicated to that logic, not used for any other purposes. SRAM has a very low latency and reading from and writing to it is very predictable. However, SRAM is an expensive resource and it is therefore desirable to reduce SRAM storage requirement.

DRAM is located elsewhere in the system and is shared by all components of the system (e.g. CPU, GPU, interfaces, etc). In a given system, there is only a finite amount of bandwidth available to read from and write to DRAM, and this bandwidth is being shared by all components of the system. The latency in reading from and writing to DRAM can vary, and so SRAM buffers are required to temporarily store data such that this data may be recalled quickly. In general, higher bandwidth requires larger buffers and so more SRAM is used. Moreover, higher bandwidth uses more power when transmitting data to and from DRAM.

High through-put applications such as image and video processing occupy a large proportion of the available bandwidth within a system and therefore reduce the bandwidth available to other components, require more SRAM, and consume more power. Since DRAM is considered a cheaper resource than SRAM per bit or byte of storage, where storage requirements are large, DRAM is preferably used in favour of the more expensive SRAM. An example of such a case is when storage for a whole frame of video data is required. Where DRAM is used for storing large amount of data (that needs to be written to DRAM and to be read later), it is desirable to reduce bandwidth requirement when writing to (and reading from) DRAM.

List of Terminology

CFA—Colour Filter Array. In order to capture colour information, several different values are required at each image location (typically representing red, green and blue levels). However, each pixel in an imaging sensor only measures a single value. A solution is to apply a single colour filter to each pixel, then interpolate the missing values at a later point. The colour filters are then known collectively as a "colour filter array". The different colours are arranged spatially in a known repeating pattern. This pattern is referred to as a "CFA pattern".

Bayer—A common CFA pattern. This is a 2×2 repeating pattern of red, green and blue filters, often simply referred to as "RGGB".

Delay Lines—Image processing algorithms implemented in fixed-function hardware (ASIC) often use a streaming pipeline architecture. If such an algorithm refers to pixels on rows above or below the row of the location currently being processed, then it is necessary to store an entire row (or entire rows) of pixel values between the two (or more) locations in SRAM so that pixel values in these rows can be recalled quickly. The memories used for this purpose are known as "delay lines" or "line buffers". Each delay line must be as long as the frame is wide to accommodate an entire row.

DMA—Direct Memory Access. DMA is the name given to the block of logic which allows a piece of fixed-function hardware to write to, or read from, the system's DRAM. It typically requires a dedicated buffer of SRAM to account for the latency and unpredictability of read and write operations.

Compand and Decompand—In this context, to "compand" a value means to apply a non-linear function to the value and storing the result using fewer bits than the original value. In general, small values are represented with full or near-full precision while larger values are more quantised. After inverting the process (or decompanding), smaller values generally have smaller error while larger values have larger error. This is a common technique in signal processing and telecommunication usually applied to absolute values. The word "compand" is a portmanteau of "compress" and "expand", but herein to differentiate between compression and expansion, "compand" is used when referring to compression and "decompand" is used when referring to expansion.

BRIEF DESCRIPTION OF THE DRAWINGS

Embodiments will now be described, with reference to the accompanying drawings, in which.

DETAILED DESCRIPTION

Figure 4:
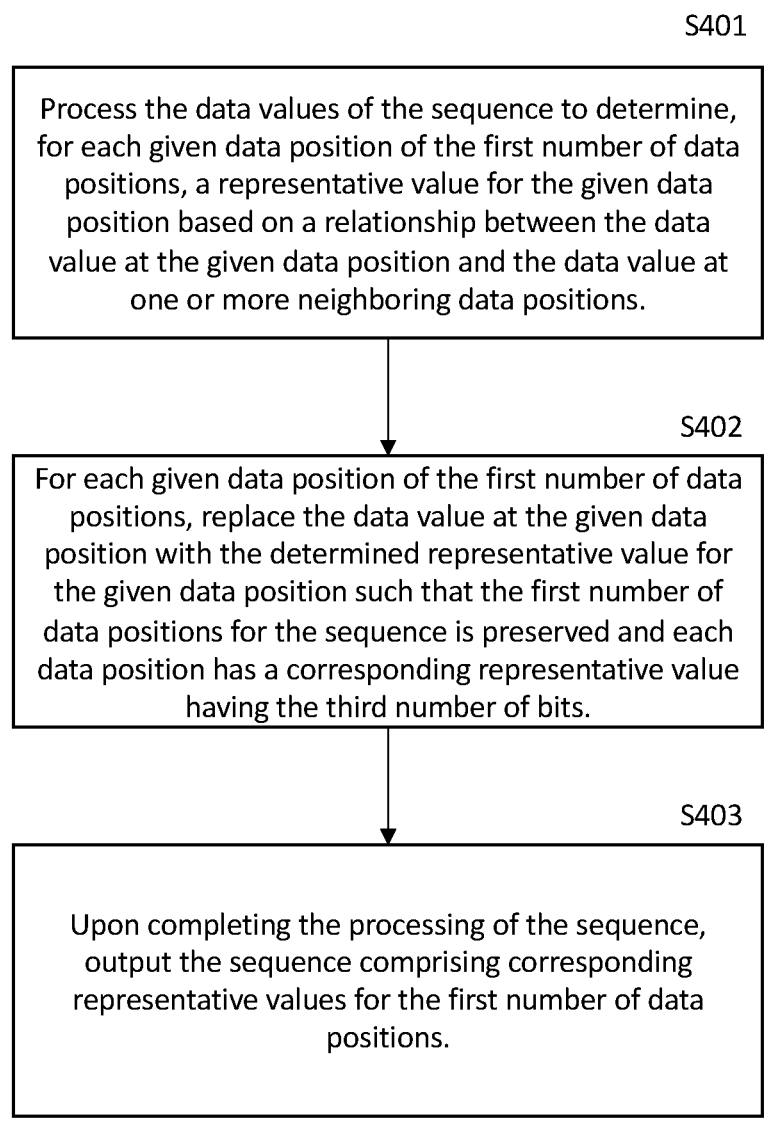
FIG. 4 shows an exemplary method of processing image data.

In view of the foregoing considerations, an aspect of the present technology provides a method of processing image data as illustrated in FIG. 4, the image data comprising a plurality of data values arranged in two or more sequences, each sequence comprising a first number of data positions each having a data value of the plurality, and each data value comprising a second number of bits, the method comprising: upon receiving each sequence of the two or more sequences, processing the data values of the sequence to determine, for each given data position of the first number of data positions, a representative value for the given data position based on a relationship between the data value at the given data position and the data value at one or more neighbouring data positions, wherein the representative value comprises a third number of bits, the third number of bits being less than the second number of bits (S401); for each given data position of the first number of data positions, replacing the data value at the given data position with the determined representative value for the given data position such that the first number of data positions for the sequence is preserved and each data position has a corresponding representative value having the third number of bits (S402); and upon completing the processing of the sequence, outputting the sequence comprising corresponding representative values for the first number of data positions (S403).

According to embodiments of the present technology, data values forming the image data are processed in the same sequence as they are streamed (received) to determine a representative value for each data position of a sequence of data values. The representative value for a given data position of the sequence is determined based on a relationship between the data value at the given data position and the data value(s) at one or more data positions neighbouring the given data position in the same sequence. In other words, the determination of the representative value of the given data position relies only on data values within the same sequence of data values. Herein, a data value may e.g. refer to an intensity value of a pixel (pixel value) or other rasterized data such as per-pixel metadata, and a data position may e.g. refer to a pixel position in an image frame. As such, implementation of the present method operates on each sequence (e.g. a row, a column, or any other arrangements) of data independently such that data can be processed as it is streamed without the need to recall data from one or more preceding or subsequent sequences. It is therefore possible to reduce SRAM storage requirements. It should be noted that herein the term "neighbouring data positions" refers to data position or positions near or close to the given data position, but is not limited to data position(s) that is(are) immediately adjacent or adjoining the given data position. Through implementation of the present technology, the processed image data comprises the same number of sequences as the unprocessed image data, and each sequence comprises the same number of data positions as before, but the data value at each data position is represented by a value that has fewer number of bits (shorter). Thus, the present technology provides a way of compressing image data that gives a predictable outcome, where the number of sequences and the number of data positions per sequence are preserved and the size of each compressed data value is the same, so the overall compression ratio of the image data is predetermined. The preservation of the number of data positions and the predictability of the size of each compressed data value means that the required bandwidth for outputting the compressed image data is known, enabling more efficient use of resources.

In some embodiments, the method may further comprise quantising the data value at a first data position of the sequence by preserving only the third number of bits amongst the second number of bits forming the data value at the first data position, and using the quantised data value as the representative value for the first data position.

In some embodiments, quantising the data value at the first data position may comprise, amongst the second number of bits of the data value at the first data position, discarding one or more least significant bits of the data value and preserving a number of most significant bits equals to the third number of bits.

In some embodiments, data values at nearby data positions are expected to deviate by only a small amount a lot of the times (e.g. pixel values at nearby pixel positions in an image). Thus, in these embodiments, processing the data values may comprise, for a second and subsequent data positions of the sequence, determining a difference between the data value of a given data position and a decompressed data value of a data position preceding the given data position.

In some embodiments, the method may further comprise compressing the determined difference at each of the second and subsequent data positions and using the compressed difference as the corresponding representative value for each of the second and subsequent data positions.

In some embodiments, the method may further comprise obtaining the decompressed data value of the first data position by appending one or more zero to the representative value at the first data position until the second number of bits is reached; or of each of the second and subsequent data positions by decompressing the representative value of the data position and adding the decompressed representative value of the data position to the decompressed data value of a data position preceding the data position.

In some embodiments, the method may further comprise, for the given data position, when the determined difference is greater than a first upper boundary value, obtaining an adjusted difference by subtracting an adjustment value from the determined difference and compressing the adjusted difference as the representative value of the given data position.

In some embodiments, the method may further comprise, when the determined difference is less than a first lower boundary value, obtaining the adjusted difference by adding the adjustment value to the determined difference and compressing the adjusted difference as the representative value of the given data position. By setting a first upper and lower boundary values and "wrap" the difference value when it exceeds the boundary values, it is possible to reduce the range of the difference value.

In some embodiments, the adjustment value may equal one plus the difference between the first upper boundary value and the first lower boundary value.

In some embodiments, the method may further comprise decompressing the representative value of the given data position and adding the decompressed representative value of the given data position to the decompressed data value of the data position preceding the given data position to obtain a decompressed data value of the given data position and, when the decompressed data value of the given data position is greater than a second upper boundary value, applying an adjustment by subtracting the adjustment value from the decompressed data value of the given data position.

In some embodiments, the method may further comprise decompressing the representative value of the given data position and adding the decompressed representative value of the given data position to the decompressed data value of the data position preceding the given data position to obtain a decompressed data value of the given data position and, when the decompressed data value of the given data position is less than a second lower boundary value, applying an adjustment by adding the adjustment value to the decompressed data value of the given data position.

In some embodiments, the difference between the second upper boundary value and the second lower boundary value may equal the adjustment value minus one.

Any suitable and desirable compression methods and algorithms may be applied to compress the determined difference. In some embodiments, compressing the determined difference may comprise companding the determined difference using a piece-wise linear curve.

In some embodiments, contents of neighbouring data positions in a sequence are not expected to exhibit high spatial frequency, or that high spatial frequency is not deemed to be important (e.g. per-pixel meta data of an image). Thus, in these embodiments, processing the data values of the sequence may comprise obtaining a mean value of a first set of data values, the first set of data values being data values at a first plurality of neighbouring data positions of a predetermined number, the mean value having a same number of bits as each data value of the first set of data values.

In some embodiments, the method may further comprise distributing the mean value amongst the first plurality of neighbouring data positions such that each given data position of the first plurality of neighbouring data positions receives a portion of the mean value comprising the third number of bits as the representative value of the given data position.

In some embodiments, the method may further comprise obtaining a subsequent mean value of a subsequent set of data values, the subsequent set of data values being data values at a subsequent plurality of neighbouring data positions of the predetermined number, and distributing the subsequent mean value amongst the subsequent plurality of neighbouring data positions such that each data position of the subsequent plurality of neighbouring data positions receives a portion of the subsequent mean value comprising the third number of bits as the representative value of the data position.

In some embodiments, the method may further comprise, when the mean value has a number of bits that is not divisible by the predetermined number, appending one or more zero to the mean value to obtain a modified mean value having a fourth number of bits, such that distributing the fourth number of bits of the modified mean value amongst the first plurality of neighbouring data positions results in each data position of the first plurality of neighbouring data positions receiving the third number of bits.

In some embodiments, the method may further comprise, when the first number of data positions is not divisible by the predetermined number, for at least one data position of the sequence, preserving only the third number of most significant bits for use as the representative value of the at least one data position, and, optionally, decompressing the representative value of the at least one data position by appending one or more zeroes thereto to reach the second number of bits.

In some embodiments, the method may further comprise decompressing the first set of data values by concatenating representative values at the first plurality of neighbouring data positions to obtain the mean value and outputting the mean value as the decompressed data value at each of the first plurality of neighbouring data positions.

Another aspect of the present technology provides a non-transitory computer-readable medium comprising machine-readable code which, when executed by a processor, causes the processor to perform a method of processing image data, the image data comprising a plurality of data values arranged in two or more sequences, each sequence comprising a first number of data positions each having a data value of the plurality, and each data value comprising a second number of bits, the method comprising: upon receiving each sequence of the two or more sequences, processing the data values of the sequence to determine, for each given data position of the first number of data positions, a representative value for the given data position based on a relationship between the data value at the given data position and the data value at one or more neighbouring data positions, wherein the representative value comprises a third number of bits, the third number of bits being less than the second number of bits; for each given data position of the first number of data positions, replacing the data value at the given data position with the determined representative value for the given data position such that the first number of data positions for the sequence is preserved and each data position has a corresponding representative value having the third number of bits; and upon completing the processing of the sequence, outputting the sequence comprising corresponding representative values for the first number of data positions to memory.

A further aspect of the present technology provides an image processing apparatus comprising: at least one processor; at least one memory storing computer program code which, when executed by the at least one processor, causes the apparatus to perform a method of processing image data, the image data comprising a plurality of data values arranged in two or more sequences, each sequence comprising a first number of data positions each having a data value of the plurality, and each data value comprising a second number of bits, the method comprising: upon receiving each sequence of the two or more sequences, processing the data values of the sequence to determine, for each given data position of the first number of data positions, a representative value for the given data position based on a relationship between the data value at the given data position and the data value at one or more neighbouring data positions, wherein the representative value comprises a third number of bits, the third number of bits being less than the second number of bits; for each given data position of the first number of data positions, replacing the data value at the given data position with the determined representative value for the given data position such that the first number of data positions for the sequence is preserved and each data position has a corresponding representative value having the third number of bits; and upon completing the processing of the sequence, outputting the sequence comprising corresponding representative values for the first number of data positions to memory.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

First Embodiment

In a first embodiment, pixel data is compressed by encoding companded differences between pixel values (data values) at nearby or neighbouring pixel positions (data positions). According to the present embodiment, the differences are determined between pairs of pixels with horizontal offset (within the same row) so as to avoid the need for additional line buffer memory (delay lines). It should be noted that vertical offset may be used instead (e.g. within the same column). It should also be noted that such horizontal positional offset is not limited to immediately adjacent pixel positions but may include every other pixel positions, every two, three, or more pixel positions as desired, as long as the same offset is applied to all pixel positions. The differences are companded in such a way that higher precision is given to smaller differences.

In an implementation example, a 12-bits per-pixel of monochrome image data is compressed to 8-bits per pixel for storage. In the present example, the image data comprises a plurality of 12-bits pixel values arranged in rows, and the image data is streamed row by row.

Compression:

For the first pixel on each row, the pixel value p at the first pixel position is quantised by discarding the 4 least significant bits (LSBs) and preserving only the 8 most significant bits (MSBs) with rounding to obtain a compressed value $p_c$, according to the equation:

$$p_c = \text{floor}\left(\frac{p+8}{16}\right)$$

$p_c$ is then the compressed value (representative value) of the pixel value p at the first pixel position, which is then output e.g. to be stored in memory.

For the second and subsequent pixels in the row, the difference, d, between each pixel value and the decompressed pixel value from the preceding position in the row (e.g. the location to the left in the row of the current pixel) is determined. Then, the difference, d, is compressed, for example companded by using a piece-wise linear curve shown in FIG. 1, to get an 8-bit value, $p_c$. The 8-bit companded value $p_c$ is then the compressed (representative) value to be output to memory.

The compressed (representative) value $p_c$ is decompressed and then used as the preceding decompressed pixel value for the compression of the pixel value at the next pixel position.

Decompression:

For the first pixel on each row, reconstruct the representative value $p_c$ into a data value of 12-bit width, e.g. by appending zeros to the end of the representative value until it reaches 12-bits, to obtain a decompressed value, $p_d$.

Figure 1:
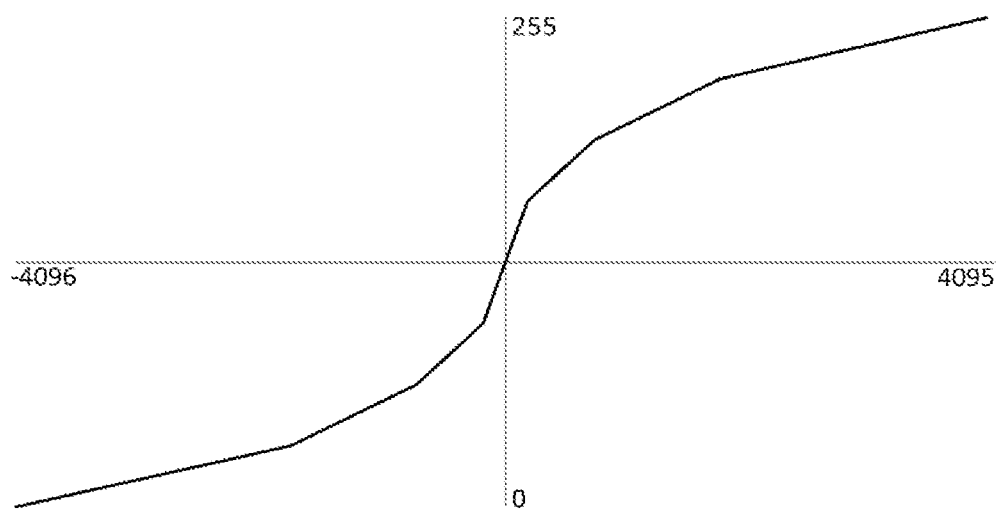
FIG. 1 shows an example of a linear curve that can be used for companding.

For each of the second and subsequent pixels in the row, decompand the representative value $p_c$ using the inverse of the companding curve shown in FIG. 1, and add the decompanded difference d to the decompressed value of the preceding pixel position to obtain the decompressed pixel value $p_d$ for the current pixel position.

According to the present embodiment, the difference value d that is encoded is obtained between the pixel value at the current pixel position and the decompressed pixel value at the preceding pixel position. As such, it is possible to reduce the accumulation of compression error, which would otherwise cause the pixel value to drift considerably from its intended (correct) value.

Second Embodiment

An optional extension to the first embodiment is to "wrap" the difference d prior to companding. In doing so, the range of values to be companded is reduced, e.g. by around half, and so a "weaker" companding curve may be used, thus conserving more precision in the data values.

Using the example above, for compression:

Wrap or adjust the difference d by applying the following rules to obtain an adjusted (wrapped) difference $d_w$:

If the difference is greater than a first upper boundary value, for example d>2077, then the adjusted difference is obtained by subtracting an adjustment value from the difference value, $d_w=d-4193$ If the difference is less than a first lower boundary value, for example d<−2115, then the adjusted difference is obtained by adding the adjustment value to the difference value, $d_w=d+4193$ Otherwise, the difference value remains the same, $d_w=d$ The wrapped or adjusted difference, $d_w$, is in the range between the first lower boundary value and the first upper boundary value, −2115 to 2077, inclusive.

Figure 2:
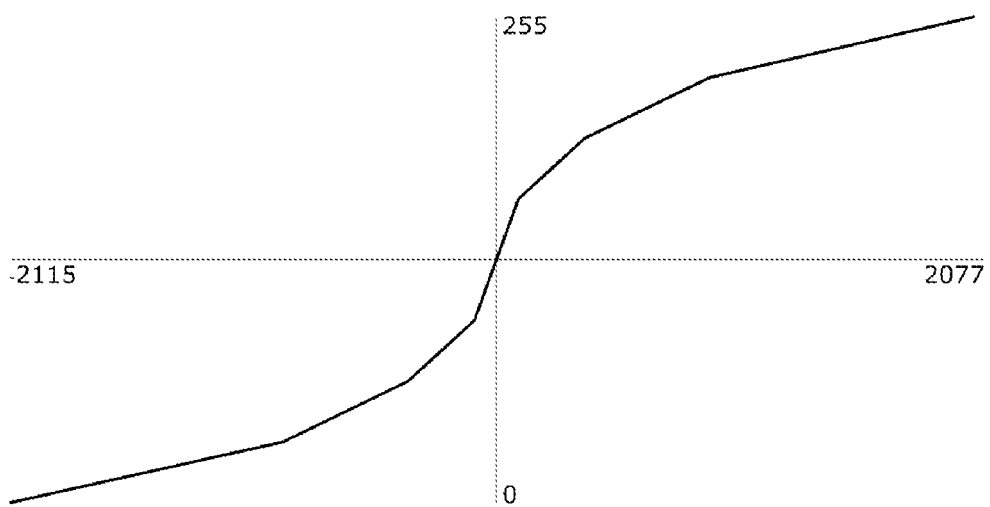
FIG. 2 shows another example of a linear curve that can be used for companding.

The adjusted difference $d_w$ is then companded using the curve shown in FIG. 2.

For decompression:

Decompand the adjusted difference $d_w$ to obtain an adjusted pixel value $p_{wd}$ as described above. Then, the adjusted pixel value $p_{wd}$ is "unwrapped" to obtain the final decompressed pixel value, $p_d$:

If the adjusted pixel value is greater than a second upper boundary value, for example $p_{wd}$>4143, then the decompressed pixel value is obtained by subtracting the adjustment value from the adjusted pixel value, $p_d=p_{wd}-4193$ If the adjusted pixel value is less than a second lower boundary value, for example $p_{wd}$<−49, then the decompressed pixel value is obtained by adding the adjustment value from the adjusted pixel value, $p_d=p_{wd}+4193$ Otherwise, the decompressed value remains the same, $p_d=p_{wd}$ Since, in the present example, the pixel-data is in the range 0-4095, the wrapped differences ($d_w$) could be limited to the range −2048 to 2047. However, a larger range is used in the present example (−2115 to 2077) so as to avoid a situation in which pixel values 0 and 4095 both being mapped to the same compressed value. Such ambiguity is difficult, if not impossible, to resolve during decompression and results in black pixels being placed in bright areas and/or white pixels being placed in dark areas.

The methods of the embodiments above have two properties that reduce, minimise or prevent undesirable image artefacts normally associated with quantisation (such as "banding"). Firstly, small differences and deviations are encoded with greater precision and so very slowly changing gradients are preserved. Secondly, since differences, rather than absolute values, are encoded, there is a degree of dithering in the decompressed images.

In the embodiments above, the preservation of small differences is achieved at the cost of greater quantisation of larger differences, for example on edges. However, the error due to greater quantisation can be visually masked by high frequency components of the edge itself—the higher the contrast of an edge, the more error can be visually tolerated. Furthermore, since overall the full input range can be represented through implementing the present embodiments, there is little to no loss of dynamic range of the image content due to compression.

The embodiments described above may be applied to Bayer data by operating on the odd and even pixels on each row separately. Moreover, the embodiments described above may be applied to RGB or YUV data by operating on each plane or channel separately.

Third Embodiment

The present embodiment is most applicable to per-pixel meta data in which content with high spatial frequency is either regarded as insignificant or is not expected to occur.

In an implementation example, 6-bits per-pixel of metadata is compressed to 2-bits per-pixel for storage. In the present example, the image metadata comprises a plurality of 6-bit data values arranged in sequences of rows, and the image metadata is streamed row by row.

Compression:

In the present embodiment, the metadata values of a predetermined number (e.g. 3) of consecutive (or neighbouring) pixel positions are used to form a set, in this example horizontally consecutive within the same row (i.e. 1×3), and a mean value is determined for the set of metadata values. The mean value for the set is then distributed amongst the three pixel positions. For example, for 6-bits per-pixel metadata, the mean value for the set is another 6-bit value, and the 6-bit mean value is distributed amongst the set of three pixel positions, resulting in a 2-bit value at each pixel position of the set. Thus, the data size of the metadata is reduced from 6-bits per pixel to 2-bits per pixel, with no change in resolution.

Figure 3A:
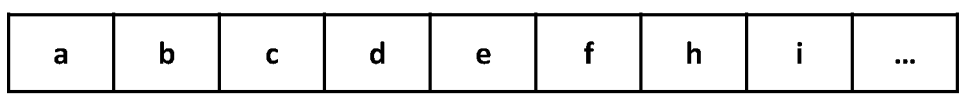
FIGS. 3A, 3B, 3C illustrate an exemplary method of processing image data.

FIG. 3A illustrates an exemplary row of metadata. References a, b, c, d, . . . each represents a 6-bits metadata value. For a first set of three consecutive 6-bit metadata values, a, b and c, assume the x-coordinate of a being a multiple of 3, the mean value m for the set is obtained by:

$$m = \text{floor}\left(\frac{(a+b+c)}{3}\right)$$

Figure 3B:
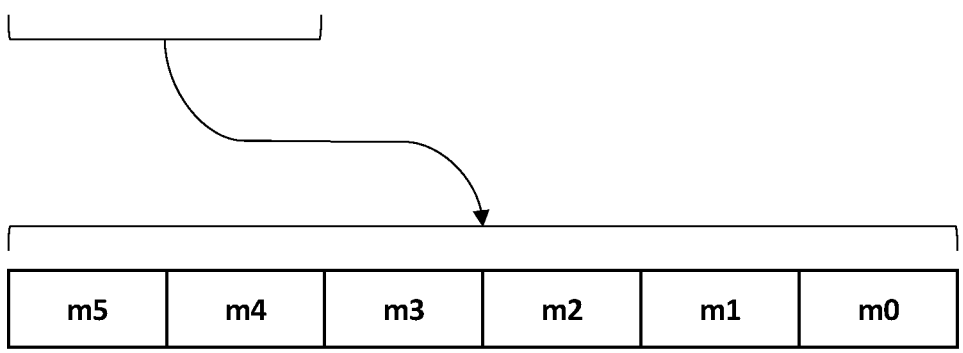

The mean value m is represented by a 6-bit value as shown in FIG. 3B, with $m_5$ being the MSB:

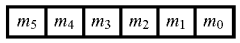

Figure 3C:
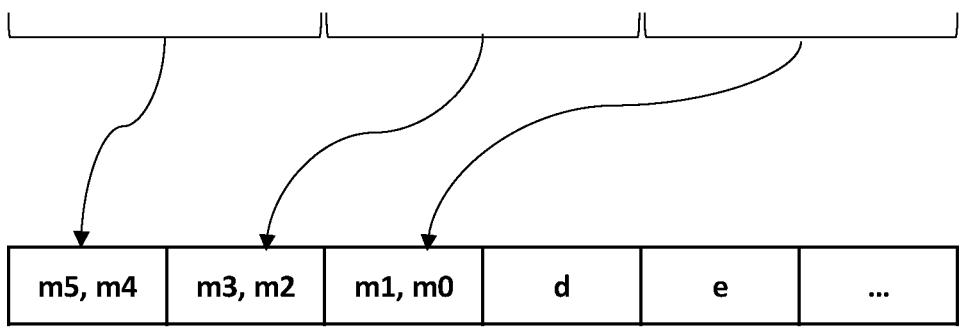

The 6-bit mean value m is then distributed amongst the pixel positions of the metadata values, a, b and c, as shown in FIG. 3C. Thus, bits $m_5$ and $m_4$ become the compressed metadata value (representative value) for position a, bits $m_3$ and $m_2$ for position b, and bits $m_1$ and $m_0$ for position c. In the present example, the compressed metadata is exactly, and predictably, 2-bits per pixel position. Note that the MSBs of the combined value (m) are output first.

In the present implementation, the frame boundary of importance is the right-hand edge. At this boundary, if the remaining pixel positions of the row is less than the predetermined number (e.g. 3) and cannot form a full set, then repetition of the last column is used for the calculation of m, and either 2 or 4 of the LSBs of m are discarded. Alternatively, for the remaining pixels that do not form a full set, the MSBs (e.g. 2 bits) are preserved and the LSBs are discarded.

Decompression:

For each row, decompress each set of predetermined number of pixel positions by first concatenating the compressed values (representative values) at each position of the set to form a single mean value. For the present example, take the three 2-bit compressed values (where the first 2-bit value corresponds to a pixel location with an x-coordinate that is a multiple of 3) of each set and concatenate the three values into a single 6-bit value. Then output the same 6-bit mean value 3 times (or fewer if at right frame boundary) for each pixel position of the set as the decompressed metadata value for that pixel position.

In the above example, the output size (2-bits) is a factor of the input size (6-bits), so that each 6-bit value can be divided into a whole number of 2-bit values. In general, this need not be the case, as the input value can be padded with zeroes until the desired number of bits is reached. For example, if a reduction from 7-bit metadata down to 2-bits per pixel is desired, an additional 0 can be appended to each 7-bit value to result in an 8-bit value, then the resulting 8-bit value can be divided into four 2-bit values.

In embodiments where a compressed value (representative value) is obtained by preserving a desired number of MSBs (and discarding the LSBs), such as at the right frame boundary, then when the compressed value is decompressed, one or more zeroes can be appended in place of the discarded LSBs. This results in the decompressed value being as close as possible to the original value.

Embodiments of the present technology provide methods of processing image data and other rasterized data such as per-pixel metadata. In particular, embodiments of the present technology provide lossy compression methods (decompressed data being not exactly the same as the original uncompressed data) capable of reducing the visible effect of this loss (of data) on the resulting decompressed images.

Embodiments of the present technology are applicable to well-known image representations such as RGB and YUV, as well as Bayer data and newer CFA patterns such as 4×4 RGBIR.

Embodiments disclosed herein operate on each row (streamed sequence) of raster data independently of other rows. As such, no additional delay lines are required to implement the present technology and thus the present technology does not require additional SRAM resources.

Embodiments disclosed herein are simple to implement compared to conventional methods such as JPEG or PNG, and can therefore be implemented at a relatively low cost (low area) in fixed function hardware. The present technology is therefore well-suited for use in high-throughput applications.

Embodiments of the present technology operate on each frame independently, such that there is no inter-frame dependency, unlike many video compression methods (e.g. HEVC). As such, according to the embodiments, an image frame can be compressed and decompressed independently without reference to any other frame(s).

An image data processing method according to the embodiments reduces the number of bits per datum (e.g. bits per pixel) at each data position while preserving the overall number of data positions (image resolution). This enables compressed and uncompressed raster data to simply be concatenated per-data position (per-pixel), and allows the concatenated data to be read and written by a single DMA. For example, in an embodiment where each data position comprises an intensity value and a metadata value, it is possible to compress only the intensity value but not the metadata value (or vice versa), at each data position or some of the data positions, depending on specific use-cases, without each set of values requiring its own DMA.

Embodiments disclosed herein may be applied to data which is to be stored in SRAM, thus reducing the amount of SRAM memory needed, or to data which is to be stored in DRAM, thus reducing bandwidth requirement.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

The invention claimed is:

1. A method of processing image data, the image data comprising a plurality of data values arranged in two or more sequences, each sequence comprising a first number of data positions each having a data value of the plurality, and each data value comprising a second number of bits, the method comprising:

upon receiving each sequence of the two or more sequences, processing the data values of the sequence to determine, for each given data position of the first number of data positions, a representative value for the given data position based on a relationship between the data value at the given data position and the data value at one or more neighboring data positions, wherein the representative value comprises a third number of bits, the third number of bits being less than the second number of bits;

for each given data position of the first number of data positions, replacing the data value at the given data position with the determined representative value for the given data position such that the first number of data positions for the sequence is preserved and each data position has a corresponding representative value having the third number of bits; and upon completing the processing of the sequence, outputting the sequence comprising corresponding representative values for the first number of data positions, wherein processing the data values of the sequence to determine the representative value for a first data position of the first number of data positions comprises compressing the data value at the first data position of the sequence by preserving only the third number of bits among the second number of bits forming the data value at the first data position, and using the compressed data value as the representative value for the first data position, and wherein processing the data values of the sequence to determine the representative value for a second and subsequent data positions of the first number of data positions comprises determining a difference between the data value of a given data position and a decompressed data value of a data position preceding the given data position, compressing the determined difference at each of the second and subsequent data positions, and using the compressed difference as the corresponding representative value for each of the second and subsequent data positions;

the method further comprising:

obtaining the decompressed data value of the first data position by appending one or more zero to the representative value at the first data position until the second number of bits is reached; and obtaining the decompressed data value of each of the second and subsequent data positions by decompressing the representative value of the data position and adding the decompressed representative value of the data position to the decompressed data value of a data position preceding the data position.

2. The method of claim 1, wherein compressing the data value at the first data position comprises, among the second number of bits of the data value at the first data position, discarding one or more least significant bits of the data value and preserving a number of most significant bits equal to the third number of bits.

3. The method of claim 1, further comprising, for the given data position, when the determined difference is greater than a first upper boundary value, obtaining an adjusted difference by subtracting an adjustment value from the determined difference and compressing the adjusted difference as the representative value of the given data position.

4. The method of claim 3, further comprising, when the determined difference is less than a first lower boundary value, obtaining the adjusted difference by adding the adjustment value to the determined difference and compressing the adjusted difference as the representative value of the given data position.

5. The method of claim 4, wherein the adjustment value equals one plus the difference between the first upper boundary value and the first lower boundary value.

6. The method of claim 4, further comprising, when the decompressed data value of the given data position is greater than a second upper boundary value, applying an adjustment by subtracting the adjustment value from the decompressed data value of the given data position.

7. The method of claim 6, further comprising decompressing the representative value of the given data position and adding the decompressed representative value of the given data position to the decompressed data value of the data position preceding the given data position to obtain a decompressed data value of the given data position and, when the decompressed data value of the given data position is less than a second lower boundary value, applying an adjustment by adding the adjustment value to the decompressed data value of the given data position.

8. The method of claim 7, wherein the difference between the second upper boundary value and the second lower boundary value equals the adjustment value minus one.

9. The method of claim 1, wherein compressing the determined difference comprises companding the determined difference using a piece-wise linear curve.

10. The method of claim 1, wherein processing the data values of the sequence comprises obtaining a mean value of a first set of data values, the first set of data values being data values at a first plurality of neighboring data positions of a predetermined number, the mean value having a same number of bits as each data value of the first set of data values.

11. The method of claim 10, further comprising distributing the mean value among the first plurality of neighboring data positions such that each given data position of the first plurality of neighboring data positions receives a portion of the mean value comprising the third number of bits as the representative value of the given data position.

12. The method of claim 11, further comprising obtaining a subsequent mean value of a subsequent set of data values, the subsequent set of data values being data values at a subsequent plurality of neighboring data positions of the predetermine number, and distributing the subsequent mean value among the subsequent plurality of neighboring data positions such that each data position of the subsequent plurality of neighboring data positions receives a portion of the subsequent mean value comprising the third number of bits as the representative value of the data position.

13. The method of claim 11, further comprising, when the mean value has a number of bits that is not divisible by the predetermined number, appending one or more zero to the mean value to obtain a modified mean value having a fourth number of bits, such that distributing the fourth number of bits of the modified mean value among the first plurality of neighboring data positions results in each data position of the first plurality of neighboring data positions receiving the third number of bits.

14. The method of claim 11, further comprising decompressing the first set of data values by concatenating representative values at the first plurality of neighboring data positions to obtain the mean value and outputting the mean value as the decompressed data value at each of the first plurality of neighboring data positions.

15. A non-transitory computer-readable medium comprising machine-readable code which, when executed by a processor, causes the processor to perform a method of processing image data, the image data comprising a plurality of data values arranged in two or more sequences, each sequence comprising a first number of data positions each having a data value of the plurality, and each data value comprising a second number of bits, the method comprising:

upon receiving each sequence of the two or more sequences, processing the data values of the sequence to determine, for each given data position of the first number of data positions, a representative value for the given data position based on a relationship between the data value at the given data position and the data value at one or more neighboring data positions, wherein the representative value comprises a third number of bits, the third number of bits being less than the second number of bits;

for each given data position of the first number of data positions, replacing the data value at the given data position with the determined representative value for the given data position such that the first number of data positions for the sequence is preserved and each data position has a corresponding representative value having the third number of bits; and upon completing the processing of the sequence, outputting the sequence comprising corresponding representative values for the first number of data positions to memory, wherein processing the data values of the sequence to determine the representative value for a first data position of the first number of data positions comprises compressing the data value at the first data position of the sequence by preserving only the third number of bits among the second number of bits forming the data value at the first data position, and using the compressed data value as the representative value for the first data position, and wherein processing the data values of the sequence to determine the representative value for a second and subsequent data positions of the first number of data positions comprises determining a difference between the data value of a given data position and a decompressed data value of a data position preceding the given data position, compressing the determined difference at each of the second and subsequent data positions, and using the compressed difference as the corresponding representative value for each of the second and subsequent data positions;

the method further comprising:

obtaining the decompressed data value of the first data position by appending one or more zero to the representative value at the first data position until the second number of bits is reached; and obtaining the decompressed data value of each of the second and subsequent data positions by decompressing the representative value of the data position and adding the decompressed representative value of the data position to the decompressed data value of a data position preceding the data position.

16. An image processing apparatus comprising:

at least one processor;

at least one memory storing computer program code which, when executed by the at least one processor, causes the apparatus to perform a method of processing image data, the image data comprising a plurality of data values arranged in two or more sequences, each sequence comprising a first number of data positions each having a data value of the plurality, and each data value comprising a second number of bits, the method comprising:

upon receiving each sequence of the two or more sequences, processing the data values of the sequence to determine, for each given data position of the first number of data positions, a representative value for the given data position based on a relationship between the data value at the given data position and the data value at one or more neighboring data positions, wherein the representative value comprises a third number of bits, the third number of bits being less than the second number of bits;

for each given data position of the first number of data positions, replacing the data value at the given data position with the determined representative value for the given data position such that the first number of data positions for the sequence is preserved and each data position has a corresponding representative value having the third number of bits; and upon completing the processing of the sequence, outputting the sequence comprising corresponding representative values for the first number of data positions to memory, wherein processing the data values of the sequence to determine the representative value for a first data position of the first number of data positions comprises compressing the data value at the first data position of the sequence by preserving only the third number of bits among the second number of bits forming the data value at the first data position, and using the compressed data value as the representative value for the first data position, and wherein processing the data values of the sequence to determine the representative value for a second and subsequent data positions of the first number of data positions comprises determining a difference between the data value of a given data position and a decompressed data value of a data position preceding the given data position, compressing the determined difference at each of the second and subsequent data positions, and using the compressed difference as the corresponding representative value for each of the second and subsequent data positions;

the method further comprising:

obtaining the decompressed data value of the first data position by appending one or more zero to the representative value at the first data position until the second number of bits is reached; and obtaining the decompressed data value of each of the second and subsequent data positions by decompressing the representative value of the data position and adding the decompressed representative value of the data position to the decompressed data value of a data position preceding the data position.

* * * * *